United States Patent [19]
Glasser

[11] Patent Number: 5,402,649
[45] Date of Patent: Apr. 4, 1995

[54] SPRAY-FREEZE SLUSH HYDROGEN GENERATOR

[75] Inventor: Sidney P. Glasser, Fullerton, Calif.

[73] Assignee: Rockwell International Corporation, Seal Beach, Calif.

[21] Appl. No.: 114,857

[22] Filed: Sep. 2, 1993

[51] Int. Cl.[6] .............................................. F17C 5/00
[52] U.S. Cl. ...................................... 62/54.1; 62/52.1
[58] Field of Search ................................ 62/54.1, 52.1

[56] References Cited

U.S. PATENT DOCUMENTS

| 3,994,141 | 11/1976 | Schrawer | 62/54.1 |
| 4,147,456 | 4/1979 | Klass | 62/54.3 |
| 5,154,062 | 10/1992 | Gaumer, Jr. et al. | 62/54.1 |
| 5,168,710 | 12/1992 | Miyazaki | 62/54.1 |

FOREIGN PATENT DOCUMENTS 3260575 11/1991 Japan .

Primary Examiner—Ronald C. Capossela
Attorney, Agent, or Firm—Terrell P. Lewis; Charles T. Silberberg

[57] ABSTRACT

A high rate, continuous production, slush hydrogen generator includes a tank, apparatus for creating a vacuum in the tank, apparatus for delivering triple point (T.P.) liquid hydrogen (LH2) to the tank, apparatus for interacting with the vacuum in the tank to produce slush hydrogen from the T.P. LH2, where the T.P. LH2 has a substantially constant solid fraction, and apparatus for delivering cold vapors from the slush in the tank to the vacuum creating apparatus. The apparatus for producing slush hydrogen in the generator includes a perforated spray ring for evaporating the T.P. LH2 and apparatus for delivering the LH2 under pressure to the spray ring.

15 Claims, 2 Drawing Sheets

SPRAY-FREEZE SLUSH HYDROGEN GENERATOR

This invention was made with Government support under Contract No. F33657-91-C-2012 awarded by the United States Air force. The government has certain rights in this invention.

FIELD OF THE INVENTION

The present invention relates to processes and apparatus for producing slush hydrogen, and more particularly to a method and apparatus for continuously producing slush hydrogen at a significantly higher rate of production than those now known in the prior art to permit reduction in the size of the slush generator required to support an aerospace vehicle of the type powered by slush fuels.

BACKGROUND OF THE INVENTION

One of the principal objectives of aerospace research today is to develop a long range, hypersonic space vehicle which can journey from the earth to various points in outer space. Recently, vehicles of this type have originated from work under the National AeroSpace Plane (NASP) program. Some of the requirements of these vehicles include high density, low volume fuel; high speed travel (hypersonic range); relative light weight; and relatively large payloads. Fuels for these vehicles which have been considered include slush fuels, such as slush hydrogen.

The production of slush hydrogen (SH2) is currently accomplished by means of a "freeze/thaw" process. For the freeze/thaw process, the pressure in a container of liquid hydrogen (LH2) is progressively reduced by a vacuum pump. The resulting evaporation of hydrogen reduces the bulk temperature to the saturation temperature corresponding to the ullage pressure. The ullage pressure will be reduced to the triple-point (T.P.) pressure of 1.02 PSIA.

After the triple-point pressure is reached, further evaporation of hydrogen will convert part of the triple-point liquid to solid hydrogen. If the pressure is continuously maintained at the triple-point pressure, the frozen hydrogen will form as a solid sheet at the surface and ultimately suppress any further freezing action. Removing vapor at a low rate is also conducive to forming a solid sheet at the surface. Removing vapor at a high rate causes violent boiling and eruption of the bulk hydrogen, resulting in a large carry-over of liquid hydrogen droplets with the vapor flow.

Tests performed in the 1960's at the Bureau of Standards Cryogenics Laboratory showed that the optimum vapor withdrawal rate to minimize liquid hydrogen carry-over was approximately 160 CFM of vapor per square foot of liquid surface area. This flow rate was referenced to the vacuum pump inlet, and the inlet vapor had to be heated (approx. 500° R, 40° F.) because of vacuum pump mechanical limitations. The corresponding volumetric withdrawal rate at the liquid surface (approx. 24.8 R) was less by a factor of approximately 20, or 8 CFM per square foot of surface area.

To eliminate the formation of a solid sheet of hydrogen at the surface, the vacuum level is cycled above and below the triple-point pressure. During this portion of the cycle (about ½ the time) when the pressure is above the triple-point, the incoming heat (heat leaks and/or warm pressurant) causes part of the solid hydrogen at the surface to melt. Since solid hydrogen is more dense than liquid hydrogen, the former sinks in the remaining liquid. A mixer (propeller) in the bulk liquid assists in breaking up the solid hydrogen and in producing a more homogeneous mixture of the slush hydrogen.

The above-described process constitutes, for the most part, the currently-used freeze/thaw slush hydrogen production process. This process, as presently practiced, is a batch-type operation, and the slush production rate is relatively slow. Typically, slush Is produced only 50% of the time and a significant portion (about 30%) of just-formed slush is melted in the thaw cycle.

For example, the slush generator at the Slush Test Facility at Martin Marietta Corporation produces slush at the equivalent rate of approximately 9 gallons per minute (GPM). For a vehicle using slush hydrogen as its fuel (e.g., a NASP-type vehicle), the required slush generation rate during the density-maintenance operation is expected to be in the range of 1000 GPM to 4000 GPM, depending on the actual heat load to the propellant during the loading operation. It can be readily seen that a substantial improvement in slush production rate must be achieved if slush hydrogen is to be used to fuel a NASP-type vehicle.

OBJECTS AND SUMMARY OF THE INVENTION

It is therefore a principal object of the present invention to provide apparatus and a method of producing slush hydrogen at a substantially higher rate than the rate of production currently known possible, while overcoming all the disadvantages and drawbacks of known like apparatus and methods.

It is another object of the present invention to provide apparatus and a method for the continuous production of slush hydrogen in quantities which will facilitate its use as a fuel for a NASP-type vehicle.

Still another object of the invention is to provide a system for the continuous, high volume production of a near-homogeneous slush hydrogen mixture having a solid particle size that allows for the attainment of a desired solid fraction in NASP vehicle tanks.

Still another object of the invention is to provide a method and a system for the continuous, high volume production of a near-homogeneous slush hydrogen mixture of a sufficient fluidity to permit transport through ground and vehicle lines and valves.

Yet another object of the invention is to provide a method and apparatus for generating a continuous, uninterrupted flow of gaseous hydrogen to support a self-contained power system, especially one which is embodied as a mobile, ground support unit.

DETAILED DESCRIPTION OF THE INVENTION

Figure 1:
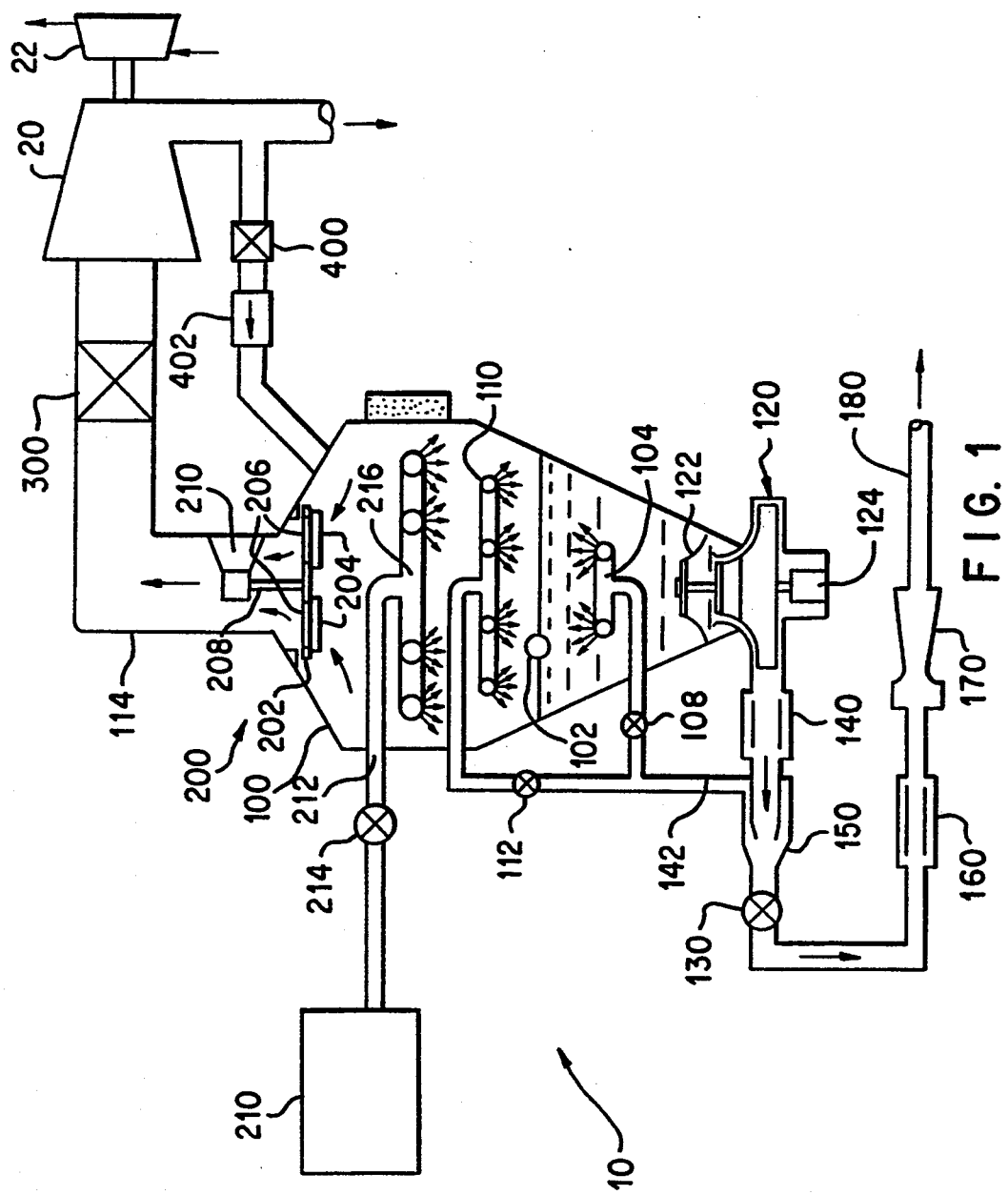
FIG. 1 is a schematic diagram of a slush generator according to the teachings of the present invention.

Referring now to FIG. 1, there is schematically shown the slush generator apparatus 10 of the present invention which has the capability of producing slush hydrogen at a rate great enough to fulfill the slush hydrogen maintenance requirements of a NASP-sized vehicle. The slush generator apparatus 10 has been designed for incorporation into the slush maintenance system described in applicant's co-pending application U.S. Ser. No. 07/950,522 filed Sept. 25, 1992.

The pressure (i.e., the vacuum) in the tank 100 of the slush generator apparatus is produced by a vacuum pump 20 which is driven by a turbine 22. The vacuum pump is preferably a high-speed, cold vapor pump of the axial or radial type, and the turbine is driven by hot gas from any of a variety of hot gas generators.

Liquid hydrogen from a triple-point catch tank 210 is introduced into the slush hydrogen tank 100 through line 212 under the control of a valve 214 to a primary spray ring 216 (discussed in greater detail below).

Operation of the control valve 214 may be automatic, as for example, in response to signals from a level sensor 102 located on the surface of the liquid component of the slush mixture inside the generator. Such automatic control would serve the purpose of maintaining the fluid level in the slush generator approximately constant at the level sensor location.

The liquid hydrogen from the triple-point catch tank 210 is transported through pipe 212 to the spray ring 216 where it is sprayed into the slush hydrogen generator. The purpose of the spray is to increase the "area" of exposure of the liquid hydrogen to facilitate its evaporation.

In an evaporative-cooling slush production process, the solid hydrogen production rate is solely a function of the mass flow rate of vapor removed from the liquid hydrogen when at the triple-point temperature. Prior attempts, such of those of the Bureau of Standards (described above), have been made to manufacture slush hydrogen by spraying liquid hydrogen into an evacuated container. In those prior tests, the liquid hydrogen flow was Kept at a very low value relative to the capacity of the vacuum pump.

As a consequence, the final product was 100% solid hydrogen (snow), which settled in drifts around the tank and required partial melting before a flowable slush mixture was obtained. This result led the Bureau of Standards researchers to abandon the spray-freeze concept in favor of the freeze-thaw process. That decision has influenced the design of all actual or proposed slush hydrogen production facilities until the innovation embodied in the present application.

In the present invention, the solid hydrogen production rate is also determined by the capacity of the vacuum system. The vacuum pump is sized to produce a mass flow rate of vapor at the triple point pressure (1.02 psia) such that the solid hydrogen production rate is equal to or greater than the required production rate. In a flight vehicle slush maintenance system, the solid hydrogen production rate would be determined by the solid hydrogen melting rate resulting from the airborne and ground systems heat loads to the slush. For a facility storage tank loading, the solid production rate would be a function of the desired, or available, time to load the tank.

The present invention is distinguished over previously developed spray-freeze slush generators in that the incoming mass flow rate of LH2 exceeds the solid production rate as determined by the vacuum pump capacity.

If the incoming LH2 is at the triple-point temperature, the solid production rate will be constant at the maximum value determined by the vacuum pump capacity. By adjusting the incoming flow rate of triple-point LH2, the composition of the product can be varied from 100% solids (snow) to slush with a very low solid fraction, all with the same solid hydrogen content. For incoming LH2 warmer than the triple-point temperature, the production rate of solid hydrogen will be diminished in direct proportion to the fraction of the vacuum pump capacity that is required to evaporatively cool the incoming LH2 to the triple point temperature.

As noted previously, if the spray-freeze slush generator is used in a vehicle slush density maintenance system, the vacuum pump capacity would be based on the solid hydrogen melting rate resulting from the cumulative heat loads in the airborne and ground systems. The output of the slush generator is slush hydrogen at a volumetric flow rate and solid fraction such that solid hydrogen is added to the vehicle system at the same rate at which solid hydrogen is melting. The total mass flow rate of maintenance fluid is returned to the catch tank 210, where it is available to be re-introduced into the slush generator for reprocessing back to slush hydrogen.

Hydrogen lost through evaporation in the refrigeration process must be replaced by liquid hydrogen to maintain a constant fluid mass in the vehicle and slush generator circuit. Under equilibrium conditions, the total system is essentially self-adjusting to provide the proper solid fraction at the required flow rate. As will be discussed later, provisions have been made to "fine tune" the effective capacity of the vacuum pump to more precisely match the solid hydrogen production rate with the solid hydrogen melting rate. Also discussed later are means to adjust the output solid fraction to minimize the volumetric flow rate of slush required to provide the required mass flow rate of solid hydrogen to the vehicle.

Essential differences between the present invention and the currently Known freeze-thaw concept are that (1) the production of slush hydrogen in the present invention is continuous, and (2) the discharge of gaseous hydrogen in the present invention is continuous. These features are essential to a practical slush maintenance unit, and to the operation of a power system utilizing gaseous hydrogen as a fuel, respectively.

With the upward flow of vapor in the slush generator, there is a tendency for the solid and/or liquid particles to be blown into the vacuum pump. To minimize this effect, the cross-sectional area of the shoulder 112 of the slush generator above the spray rings should be made as large as practicable to reduce the upward velocity of vapor. To further assure as little loss of liquids or solids as possible through the vacuum pump, a centrifugal separator 200 is mounted downstream of the neck 114 of the slush generator. The separator 200 includes a flat plate 202 having a plurality of radially extending slots 206 formed therein and a set of flaps or louvers 204 displaced from the plane of the flat plate at an angle thereto and adjacent the slots. The flaps of the separator 200 function to deflect or slap solid or liquid particles away from the slots, and allow only vapor to pass through.

The plate 202 of the separator 200 is supported on a vertically oriented shaft 208 which is rotatably coupled to the drive of a motor 210 mounted in the neck of the slush generator.

Figure 2:
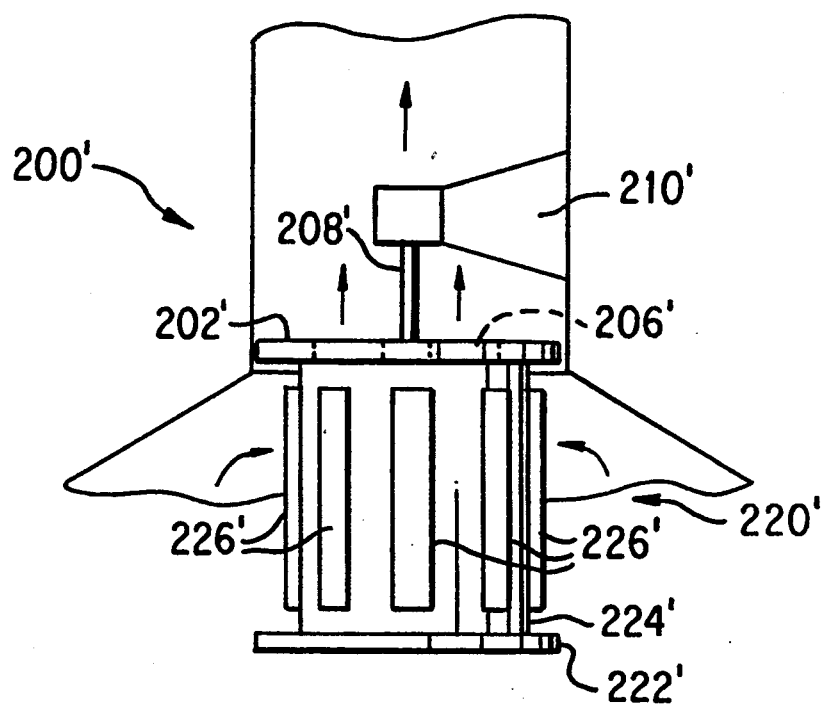
FIG. 2 is a schematic view of an alternate embodiment of a solid-vapor separator assembly for use with the slush generator of the present invention.

FIG. 2 shows an alternate embodiment 200' of the separator, which includes a motor 210', a shaft 208' rotatably coupled between the drive of the motor and a first plate 202'. The first plate includes a plurality of slots 206' preferably disposed radially about the plate.

The first plate 202' forms the top of a cylinder or drum 220' which includes a solid bottom 222', a plurality of louvers or flaps 226' secured to the vertical supports 224' so that the flaps are arranged substantially perpendicular to the first and second plates.

The invention contemplates various other similar arrangements of centrifugal separators, the purpose of all of which is to eliminate large losses of solid or liquid hydrogen. However, a small loss of liquid or solids would have a negligible effect on the overall production rate of the slush generator, and could even yield a desirable result by reducing the power requirement for the vacuum pump by cooling the vapor as it passes through the pump.

Referring again to FIG. 1, a centrifugal pump 120 located at the bottom of the slush generator draws slush from the bottom of the generator tank and increases the fluid pressure for transfering the slush to the vehicle propellant tanks or to a facility storage tank. Inasmuch as the solid particles formed by the spray evaporation process tend to be large and fluffy, the fluidity of slush hydrogen at the desired solid fraction may not be sufficient to permit pumping and movement through the slush transport lines. To eliminate this problem, mixer or blender blades 122 are provided above the pump 120 in the bottom of the generator tank. These blades have a configuration similar to those in a typical household blender, and are incorporated into, and driven by the motor 124 of, the pump. Alternatively, the mixer or blender could be driven by a separate, dedicated motor. The blades are provided with relatively sharp leading edges with alternate positive and negative angles of attack, and function to reduce the particle size to enhance packing and to produce a more homogeneous mixture of the fluid as it enters the pump. The bottom of the generator tank 100 is conical to assure that all of the pumped fluid passes through the mixer blades. The action of the mixer blades creates an enhanced packing effect that is currently produced by "aging" of the newly-formed slush.

The slush hydrogen output flow is controlled by a modulating valve 130. This valve can be controlled in response to signals from a vehicle loading control system. The density (solid fraction) of the pump discharge is monitored by an in-line density sensor 140. If the measured density is lower than desired, part of the triple point liquid hydrogen portion of the slush hydrogen can be stripped from the flow and returned to the slush generator through the pipe 142. The stripping of triple point liquid hydrogen is accomplished using a solid-liquid separator 150 comprising a simple flow-reversing fluid device for causing the heavier solid particles to separate from the lighter liquid. The liquid flow is reintroduced into the slush generator through a plurality of appropriately sized apertures in the recirculatory spray ring 110, and part of this liquid is ultimately converted to a solid state. Since the flow into the tank 100 through valve 214 is controlled by the level sensor 102, recirculation of liquid hydrogen from the solid-liquid separator reduces the volumetric outflow of fluid from the tank, thereby causing a corresponding reduction in the flow rate through the valve 214.

The effect of recirculating LH2 through pipe 142 is to increase the solid fraction of solid hydrogen delivered through the valve 130. An alternative to returning the recirculated LH2 through spray ring 110 is to introduce all or part of it through the mixing ring 104. The liquid introduced through the ring 104 serves as an added mixer for the slush in tank 100. In addition, the heat added to the recirculated LH2 by the pump 120 serves to melt small protrusions on the solid hydrogen particles, thereby enabling a higher packing density within tank 100. The division of flow through the pipe 142 is controlled by modulating valves 112 and 108. The optimum division will be determined by operating experience. Regardless of the flow rate or destination of the recirculated fluid, the solid hydrogen production rate is still controlled by the mass flow rate of vapor extracted by the vacuum pump.

While optimum separation efficiency of solid-liquid separator 150 is desired, some small fraction of solids in the recirc lines is acceptable as long as the orifices in the rings are sized to accommodate whatever solids are entrained. No problem is envisioned, since the mixer blades should produce small particles. Also, a lage particle is less likely to reverse direction and be entrained in the recirculation flow.

The final output slush density is measured by in-line density sensor 160. In practice, the measurement at the sensor 160 will be used as the input signal to control the valves 108 and 112. The measured pressure differential across the venturi flow meter 170 in conjunction with the density measurement from sensor 160 can be used to calculate the mass flow rate of slush hydrogen being delivered to a vehicle tank for slush density maintenance, or to a facility storage tank.

The slush generation rate can be varied by modulating valve 300, which creates a pressure drop and thereby has the effect of reducing the vapor withdrawal rate from the slush generator tank. An alternate method of generation rate control is to modulate valve 400 via the check valve 402. The backflow through valve 400 will also have the effect of reducing the vapor withdrawal rate. By opening up valve 400 wide, the pressure in the generator tank can be increased to be in excess of 1.02 PSIA, whereupon solid formation will cease. The compressively-heated vapor will serve a defrost or thaw function in the event accumulated solids obstruct the flow passages of the solid/vapor separator.

Line 420 carries the hydrogen vapor drawn off the LH2 in tank 100 by the vacuum pump 20 during the manufacture of SH2. The discharged hydrogen can be used in the power system (which is the preferred use) or just dumped into a burn stack for disposal.

The slush generator tank must be well-insulated to avoid excessive heat input to the slush hydrogen and/or the liquefaction of ambient air on the exterior of the tank. All lines and valves must be similarly insulated. Foam insulation 500 may be used on development units. The ultimate unit will preferably employ a vacuum-jacketed tank and lines with multi-layer insulation to reduce the input heat to an absolute minimum.

The slush generator as described herein can also be used for the basic facility slush plant for preparing and accumulating slush hydrogen for the initial vehicle loading. The only difference is that free-boiling (F.B.) liquid hydrogen, saturated at the local ambient pressure, would be introduced through valve 214 instead of triple-point (T.P.) LH2. The slush production rate would be reduced by virtue of the fact that additional evaporation is required to convert the F.B. liquid hydrogen to triple point (T.P.) liquid hydrogen before any solids are formed.

While certain representative embodiments and details have been shown for the purpose of illustrating the invention, it will be apparent to those skilled in this art that various changes and modifications may be made therein without departing from the spirit or scope of this invention.

What is claim is:

1. A high rate, continuous production, slush hydrogen generator, comprising:
   a tank,
   means for creating a vacuum in said tank,
   means for delivering triple point (T.P.) liquid hydrogen (LH2) to said tank,
   means for flashing said T.P. LH$_2$ into said tank, thereby producing cold vapors and slush hydrogen with a substantially constant solid fraction, and
   means for delivering cold vapors from said tank to said vacuum creating means.

2. The slush hydrogen generator of claim 1, wherein said flashing means comprises a perforated spray ring and means for delivering said liquid hydrogen under pressure to said spray ring.

3. The slush hydrogen generator of claim 1, wherein said vacuum creating means comprises a vacuum pump fluidly coupled with said tank.

4. The slush hydrogen generator of claim 3, wherein said vacuum pump is driven by a turbine and is fluidly communicated, via ducting, with said cold vapors in said tank.

5. The slush hydrogen generator of claim 4, wherein said ducting includes means for filtering solid particles from said vapors.

6. The slush hydrogen generator of claim 5, and further including sensors in said ducting for controlling operation of said vacuum creating means.

7. The slush hydrogen generator of claim 1, and further including means for removing a desired amount of slush hydrogen from said tank for delivery to a point of use.

8. The slush hydrogen generator of claim 7, wherein said removing means comprises pumping means for drawing slush hydrogen from said tank, said pumping means communicating with a lower region of said tank.

9. The slush hydrogen generator of claim 7, and further including means for returning a portion of the liquid hydrogen component, removed as slush hydrogen from said tank, back to said tank.

10. The slush hydrogen generator of claim 9, wherein said portion returning means includes means for spraying said liquid hydrogen into said vacuum in said tank.

11. The slush hydrogen generator of claim 10, wherein said spraying means comprises a perforated ring member disposed above the surface of said slush hydrogen mixture.

12. The slush hydrogen generator of claim 10, wherein said portion returning means includes means for injecting said liquid hydrogen into said slush hydrogen in said tank.

13. The slush hydrogen generator of claim 12, wherein said injecting means comprises a perforated mixing ring located within said tank below the surface of said slush hydrogen mixture.

14. The slush hydrogen generator of claim 12, wherein said spraying means and said injecting means are fluidly coupled.

15. The slush hydrogen generator of claim 12, wherein said spraying means and said injecting means are fluidly coupled with said pumping means.

* * * * *